United States Patent
Thompson

(10) Patent No.: US 8,086,067 B2
(45) Date of Patent: Dec. 27, 2011

(54) NOISE CANCELLATION

(75) Inventor: Laurence A. Thompson, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1030 days.

(21) Appl. No.: 11/941,050

(22) Filed: Nov. 15, 2007

(65) Prior Publication Data

US 2008/0152253 A1   Jun. 26, 2008

Related U.S. Application Data

(60) Provisional application No. 60/876,223, filed on Dec. 20, 2006.

(51) Int. Cl.
  G06K 9/40 (2006.01)
  G06K 9/46 (2006.01)
  G06K 9/66 (2006.01)
  G06K 9/48 (2006.01)
  G06K 9/00 (2006.01)

(52) U.S. Cl. ........ 382/275; 382/264; 382/260; 382/190; 382/199; 382/181

(58) Field of Classification Search ................. None
See application file for complete search history.

(56) References Cited

U.S. PATENT DOCUMENTS

| | | | |
|---|---|---|---|
| 4,997,321 A | 3/1991 | Adams | |
| 5,357,606 A | 10/1994 | Adams | |
| 5,532,751 A | 7/1996 | Lui | |
| 5,550,592 A | 8/1996 | Markandey et al. | |
| 5,689,301 A | 11/1997 | Christopher et al. | |
| 5,790,269 A * | 8/1998 | Masaki et al. | 358/447 |
| 5,796,875 A | 8/1998 | Read | |
| 5,852,475 A * | 12/1998 | Gupta et al. | 348/606 |
| 5,857,118 A | 1/1999 | Adams et al. | |
| 5,920,356 A | 7/1999 | Gupta et al. | |
| 6,055,018 A | 4/2000 | Swan | |
| 6,064,776 A * | 5/2000 | Kikuchi et al. | 382/260 |
| 6,069,664 A | 5/2000 | Zhu et al. | |
| 6,167,164 A | 12/2000 | Lee | |
| 6,219,747 B1 | 4/2001 | Banks et al. | |
| 6,285,801 B1 | 9/2001 | Mancuso et al. | |
| 6,380,978 B1 | 4/2002 | Adams et al. | |

(Continued)

FOREIGN PATENT DOCUMENTS

EP   0881837   12/1998

(Continued)

OTHER PUBLICATIONS

International Search Report and Written Opinion from PCT Application No. PCT/US2007/084881, Search report dated Mar. 25, 2008, 10 pages.

(Continued)

*Primary Examiner* — Vikkram Bali
*Assistant Examiner* — Michelle Entezari
(74) *Attorney, Agent, or Firm* — Blakely, Sokoloff, Taylor & Zafman LLP

(57) ABSTRACT

A technique for reducing noise in a digital video signal is disclosed. In one embodiment, the technique involves receiving a digital signal. The digital signal can be filtered thereby generating a filtered signal. The digital signal and the filtered signal can be mixed according to a composite blend map thereby generating an optimized signal. The optimized signal can be provided as an output.

15 Claims, 10 Drawing Sheets

U.S. PATENT DOCUMENTS

| | | | |
|---|---|---|---|
| 6,385,692 B2 | 5/2002 | Banks et al. | |
| 6,393,505 B1 | 5/2002 | Scalise et al. | |
| 6,421,090 B1 | 7/2002 | Jiang et al. | |
| 6,459,455 B1 | 10/2002 | Jiang et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,587,158 B1 | 7/2003 | Adams et al. | |
| 6,621,937 B1 * | 9/2003 | Adams et al. | 382/275 |
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,757,442 B1 * | 6/2004 | Avinash | 382/274 |
| 6,859,237 B2 | 2/2005 | Swartz | |
| 6,867,814 B2 | 3/2005 | Adams et al. | |
| 6,975,776 B2 * | 12/2005 | Ferguson | 382/260 |
| 6,999,047 B1 | 2/2006 | Holtslag | |
| 7,023,487 B1 | 4/2006 | Adams | |
| 7,027,099 B2 | 4/2006 | Thompson et al. | |
| 7,089,577 B1 | 8/2006 | Rakib et al. | |
| 7,126,643 B2 | 10/2006 | Song et al. | |
| 7,136,541 B2 | 11/2006 | Zhang et al. | |
| 7,154,556 B1 | 12/2006 | Wang et al. | |
| 7,206,025 B2 | 4/2007 | Choi et al. | |
| 7,236,209 B2 | 6/2007 | Martin | |
| 7,257,272 B2 * | 8/2007 | Blake et al. | 382/275 |
| 7,345,708 B2 | 3/2008 | Winger et al. | |
| 7,349,028 B2 | 3/2008 | Neuman et al. | |
| 7,362,376 B2 | 4/2008 | Winger et al. | |
| 7,391,468 B2 | 6/2008 | Shah | |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 | 8/2008 | Zhu | |
| 7,474,354 B2 | 1/2009 | Kawamura et al. | |
| 7,515,205 B1 | 4/2009 | Wang et al. | |
| 7,519,332 B1 | 4/2009 | Suematsu | |
| 7,529,426 B2 | 5/2009 | Neuman | |
| 7,551,800 B2 * | 6/2009 | Corcoran et al. | 382/275 |
| 7,557,861 B2 | 7/2009 | Wyman | |
| 7,605,866 B2 | 10/2009 | Conklin | |
| 7,657,098 B2 * | 2/2010 | Lin et al. | 382/199 |
| 7,659,939 B2 | 2/2010 | Winger et al. | |
| 7,667,773 B2 | 2/2010 | Han | |
| 7,710,501 B1 | 5/2010 | Adams et al. | |
| 7,865,035 B2 * | 1/2011 | Lin et al. | 382/275 |
| 7,940,992 B2 * | 5/2011 | Johnson et al. | 382/254 |
| 7,969,511 B2 * | 6/2011 | Kim | 348/625 |
| 7,986,854 B2 * | 7/2011 | Kim et al. | 382/275 |
| 2002/0149685 A1 * | 10/2002 | Kobayashi et al. | 348/252 |
| 2002/0149703 A1 | 10/2002 | Adams et al. | |
| 2004/0042673 A1 | 3/2004 | Boon | |
| 2004/0189877 A1 | 9/2004 | Choi et al. | |
| 2005/0122433 A1 * | 6/2005 | Satou et al. | 348/701 |
| 2005/0128360 A1 | 6/2005 | Lu | |
| 2006/0072037 A1 | 4/2006 | Wyman | |
| 2007/0052845 A1 | 3/2007 | Adams | |
| 2007/0103588 A1 | 5/2007 | MacInnis et al. | |
| 2007/0223835 A1 | 9/2007 | Yamada et al. | |
| 2008/0123998 A1 | 5/2008 | Gomi et al. | |
| 2008/0143873 A1 * | 6/2008 | Neuman | 348/384.1 |
| 2008/0151103 A1 | 6/2008 | Asamura et al. | |

FOREIGN PATENT DOCUMENTS

| | | |
|---|---|---|
| EP | 1039760 | 9/2000 |
| EP | 1434438 A2 | 6/2004 |
| EP | 1492344 A1 | 12/2004 |
| JP | 2001-245155 A2 | 9/2001 |
| JP | 2005122361 A | 5/2005 |
| JP | 2007213125 A | 8/2007 |

OTHER PUBLICATIONS

Co-pending U.S. Appl. No. 10/753,909, filed Jul. 7, 2004.
Co-pending U.S. Appl. No. 10/889,855, filed Jul. 12, 2004.
Co-pending U.S. Appl. No. 11/487,144, filed Jul. 13, 2006.
Co-pending U.S. Appl. No. 11/512,754, filed Aug. 29, 2006.
Co-pending U.S. Appl. No. 12/204,760, filed Sep. 4, 2008.
Co-pending U.S. Appl. No. 12/703,623, filed Feb. 10, 2010.
Co-pending U.S. Appl. No. 11/437,357, filed May 19, 2006.
International Search Report PCT/US2009/054427 dated Mar. 17, 2010 pp. 1-3.
International Search Report PCT/US2010/023775 dated Oct. 11, 2010, pp. 1-3.
Supplementary European Search Report 06 814 256 dated Mar. 31, 2010, pp. 1-7.
Final Office Action mailed Apr. 19, 2010 for U.S. Appl. No. 11/487,144, filed Jul. 13, 2006.
Non-Final Office Action mailed Aug. 20, 2010 for U.S. Appl. No. 11/487,144, filed Jul. 13, 2006.
Non-Final Office Action mailed Dec. 31, 2009 for U.S. Appl. No. 11/487,144, filed Jul. 13, 2006.
Non-Final Office Action mailed Mar. 18, 2008 for Issued Patent No. 7,400,359, U.S. Appl. No. 10/753,909, filed Jan. 7, 2004.
Non-Final Office Action mailed Sep. 11, 2009 for Issued Patent U.S. Patent No. 7,710,501, U.S. Appl. No. 10/889,855, filed Jul. 12, 2004.
Non-Final Office Action mailed Sep. 23, 2010 for U.S. Appl. No. 11/437,357, filed on May 19, 2001.
Notice of Allowance mailed Feb. 8, 2010 for Issued Patent No. 7,710,510, U.S. Appl. No. 10/889,855, filed Jul. 12, 2004.
Notice of Allowance mailed May 30, 2008 for Issued Patent No. 7,400,359, U.S. Appl. No. 10/753,909, filed Jan. 7, 2004.
Notice of of Allowance mailed Sep. 3, 2010 for U.S. Appl. No. 11/512,754, filed Aug. 29, 2006.
Restriction Requirement mailed Feb. 25, 2010 for U.S. Appl. No. 11/437,357, filed May 19, 2006.
Written Opinion PCT/US2006/34785 dated Apr. 4, 2007, pp. 1-4.
Written Opinion PCT/US2007/084881 dated Mar. 25, 2008 pp. 1-4.
Written Opinion PCT/US2009/054427 dated Mar. 17, 2010 pp. 1-3.
Written Opinion PCT/US2010/023775 dated Oct. 11, 2010, pp. 1-5.
"Analog Devices CMOS 180 MHz DDS/DAC Synthesizer", AD9851, Rev. C, Analog Devices, Inc., www.analog.com.pp. 1-23 (1999).
International Search Report PCT/US2006/034785 dated Apr. 4, 2007.
Notice of Allowance mailed Dec. 1, 2010 U.S. Appl. No. 11/437,357, filed May 19, 2006.
Notice of Allowance mailed Dec. 9, 2010 U.S. Appl. No. 11/487,144, filed Jul. 13, 2006.
Non-Final Office Action mailed Jun. 25, 2010 U.S. Appl. No. 11/512,754, filed Aug. 29, 2006.
Non-Final Office Action mailed Dec. 13, 2010 U.S. Appl. No. 11/512,754, filed Aug. 29, 2006.
Notice of Allowance mailed Feb. 7, 2011 U.S. Appl. No. 11/512,754, filed Aug. 29, 2006.
Notice of Allowance mailed Mar. 21, 2011 U.S. Appl. No. 11/487,144, filed Jul. 13, 2006.
Notice of Allowance mailed Mar. 9, 2011 U.S. Appl. No. 11/437,357, filed May 19, 2006.
Office Action mailed Jul. 16, 2010 EP Patent Application No. 06814256.1, filed on Sep. 8, 2006.
Office Action mailed Feb. 10, 2011 EP Patent Application No. 06814256.1, filed on Sep. 8, 2006.
Office Action mailed Aug. 18, 2010 CA Patent Application No. 2,620,820, filed on Sep. 8, 2006.
Non-Final Office Action for U.S. Appl. No. 11/512,754 mailed May 11, 2011.
International Preliminary Report on Patentability PCT/US2009/054427 dated Mar. 17, 2011, pp. 1-5.

* cited by examiner

NOISE CANCELLATION

RELATED APPLICATIONS

This application claims priority to U.S. Provisional Patent Application No. 60/876,223, filed Dec. 20, 2006, and entitled "Noise Cancellation," by Laurence A. Thompson, and is hereby incorporated herein by reference.

BACKGROUND

The consumer video industry has been undergoing significant changes over the past few years due to the transition from analog to digital transmission and storage and the adoption of new video formats, including high definition. In parallel, digital display technologies are rapidly converting from the old CRT to new digital technologies, including LCD, plasma, and DLP.

Consumer expectations for video image quality are rising and digital high definition displays are capable of resolving increasingly fine details. For this reason, consumers are becoming less tolerant of noise and distortion in video images.

The term "noise" is used informally as a catch-all term that when applied to video images means almost anything that looks unnatural or diminishes the clarity of the video image. The term has traditionally been used to describe stray or random electrical signals that are imposed on a video signal. A characteristic of this type of noise is that the unwanted noise signal is uncorrelated to the video signal. Traditional techniques for removing this type of uncorrelated noise include temporal averaging, in which multiple video frames are averaged to diminish the appearance of noise. This type of temporal averaging requires motion detection, because the temporal averaging must be applied only to areas of the video where there is no motion to prevent motion blurring. This also limits the noise suppression to areas in the video image where there is no motion.

Increasingly, video signals are transmitted digitally. Digital transmission requires the use of digital compression to reduce transmission bandwidth and storage requirements. In the United States, the FCC has mandated the MPEG2 video compression standard for digital terrestrial broadcast. Cable and satellite providers may use MPEG2 or they may use other standards, such as H.264. Most video compression standards are "lossy." This means that the compressed video is not identical the pre-compressed video. As the compression ratio is increased, the lossy compression standards result in increasing distortion in the compressed video.

The distortion introduced by video compression is also informally referred to as "noise." But it is actually an artifact of the video compression processing. It is unlike the random noise described earlier in that it is correlated to image details or to rapid motion. Since it is correlated to the image content of the video, the temporal averaging technique described above is not effective in removing noise due to compression processing because this type of noise is correlated to motion of feature elements of the video image.

Compression processing introduces a number of distortions in the compressed video signal. The most common types of distortion are referred to as "block noise" and "mosquito noise." Both of these types of noise are objectionable to a viewer because they are clearly unnatural in appearance.

Block noise typically appears in compressed video in areas of rapid motion. If the video compression and transmission system can not provide enough new information to update rapid motion, then an entire DCT block of pixels may be temporarily assigned a single color. The term "DCT" means "Discreet Cosine Transform" which is a mathematical operation used in most compression standards. The size of a DCT block of pixels in the MPEG2 compression standard is 8×8 pixels, so in areas of rapid motion, an 8×8 block of pixels can be assigned a single color. This results in the temporary appearance of blocks of 8×8 in the video image.

Mosquito noise is another artifact of lossy compression processing. Mosquito noise appears in the video image as small dots or distortions in the luma value of pixels that are near the edges of objects. Object edges convert to high frequencies by the DCT process. Mosquito noise is the result of course quantization of the higher frequency components of a video image as a result of compression processing. Mosquito noise will appear in close proximity to object edges. Mosquito noise will be distributed within the same 8×8 block as the pixels that make up the object edge. This bounds the area where mosquito noise is visible.

In addition to the block noise and mosquito noise artifacts described previously, compression processing tends to remove detail from video images.

What is needed is a method that can remove compression artifacts and enhance video images.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for reducing noise in a digital video signal involves the use of a composite blend map. An example of a method according to the technique involves receiving a digital signal. The digital signal can be filtered thereby generating a filtered signal. The digital signal and the filtered signal can be mixed according to the composite blend map thereby generating an optimized signal. The optimized signal can be provided as an output.

In alternate embodiments, an edge detector can be applied to the filtered signal thereby generating an edge detected signal. A predictor can be applied to the edge detected signal to generate a proximity map. The edge detected signal can be subtracted from the proximity map to generate the composite blend map. In some embodiments, the edge detector can generate the edge detected signal by calculating a gradient of the filtered signal by taking a first derivative of change in luminance in the filtered signal.

In additional embodiments, the predictor can include a 17×17 block. Applying the predictor can involve passing the 17×17 block over each location corresponding to a pixel location of the edge detected signal. For instance, in certain embodiments, the 17×17 block can have a center that is capable of detecting the value of first derivatives in the edge detected signal. The 17×17 block can also be capable of selecting the largest edge detection value within the pixel locations covered by the 17×17 block and assigning that value to the location corresponding to the center of the 17×17 block in the proximity map.

In other embodiments, the composite proximity map can be modified in order to further reduced noise. In additional embodiments, the edge detected signal can be modified in order to improve selectivity of filtered areas and disqualify areas where filtering is inappropriate. In further embodiments, the filtering step can involve applying a low pass filter or a Gaussian blur to the digital video signal.

An example of a system according to the technique includes a filter, a composite blend map generator and a mixing module. The filter can be capable of receiving and filtering a digital signal. The composite blend map generator can be capable of receiving the digital signal and generating a composite blend map based on the digital signal. The mixing module can be capable of mixing the digital signal and the filtered signal according to the composite blend map.

In further embodiments, the system can further include an edge detector and a proximity map generator. The edge detector can be capable of receiving the filtered signal and detecting edges within the filtered signal. The proximity map generator can be capable of receiving the edge detected signal and generating a proximity map based on the edge detected signal. The composite blend map can be generated by subtracting the edge detected signal from the proximity map.

An example of a method for enhancing a digital signal involves receiving a digital signal. The digital signal can be filtered thereby generating a filtered signal. The filtered signal can be subtracted from the digital signal thereby generating a modified signal. The modified signal can be added to the digital signal thereby generating an optimized signal which can be provided as an output.

The proposed system, method and device can offer, among other advantages, the reduction of compression artifacts including mosquito noise reduction and general noise reduction. Further, the proposed system, method and device can generally enhance signal quality and qualifiedly enhance signal quality. Advantageously, the proposed system, method and device can reduce noise and improve signal quality on a frame by frame basis. These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION OF THE DRAWINGS

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
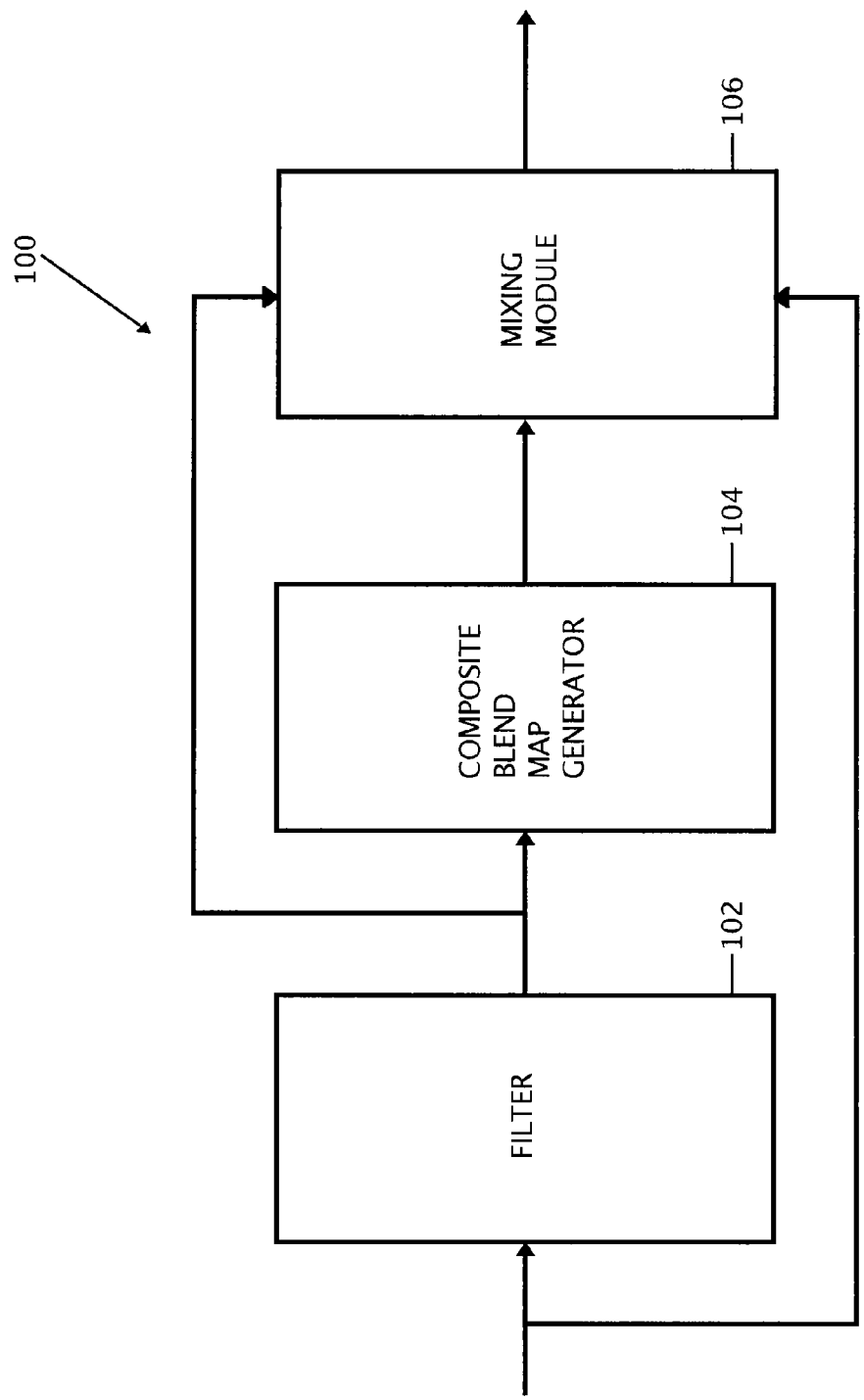
FIG. 1 depicts an example of a system for optimizing a digital signal.

FIG. 1 depicts a system 100 for optimizing a digital signal. In the example of FIG. 1, the system 100 includes a filter 102, a composite blend map generator 104, and a mixing module 106. The filter 102 is coupled to the composite blend map generator 104 and the mixing module 106. The composite blend map generator 104 is also coupled to the mixing module 106.

In operation, the filter 102 receives a digital signal as an input. The digital signal can be any convenient and/or known digital signal, including, but not limited to, a digital video signal. Further, the digital signal can be a compressed digital signal using any convenient and/or known compression technique, including for example and not limitation, MPEG2, MPEG4, and/or any other lossy or lossless compression scheme. The filter 102 can be any known and/or convenient filter capable of generating a filtered signal. In one embodiment, the filter 102 can be a low-pass filter which blocks the high frequency content of the digital signal. In other embodiments, the filter 102 can apply a Gaussian blur to the digital signal to generate the filtered signal.

The filtered digital signal is provided to the composite blend map generator 104. The composite blend map generator 104 utilizes the filtered digital signal to generate a composite blend map. The composite blend map can be generated in any convenient and/or known manner capable of generating a map for mixing the digital signal and the filtered digital signal. For example, and not limitation, the digital signal can be analyzed to determine the location of noise in the signal. In certain embodiments, the noise can be correlated with the brightness which can be found around the edges of an object in the digital signal due to the quantization of high frequencies.

The mixing module 106 can receive the composite blend map from the composite blend map generator 104 as well as the digital signal and the filtered digital signal. The mixing module 106 can mix the digital signal and the filtered digital signal according to the composite blend map and output an optimized signal. For example, and not limitation, the mixing module 106 can retain all the regions in the digital signal that do not contain noise and replace all regions that contain noise with the filtered digital signal. In this example, the composite blend map is used to determine the regions that contain noise and those without noise. In other embodiments, the determination of noisy regions can be facilitated using any known and/or convenient technique and the result can be used to mix the digital signal and the filtered signal.

Figure 2:
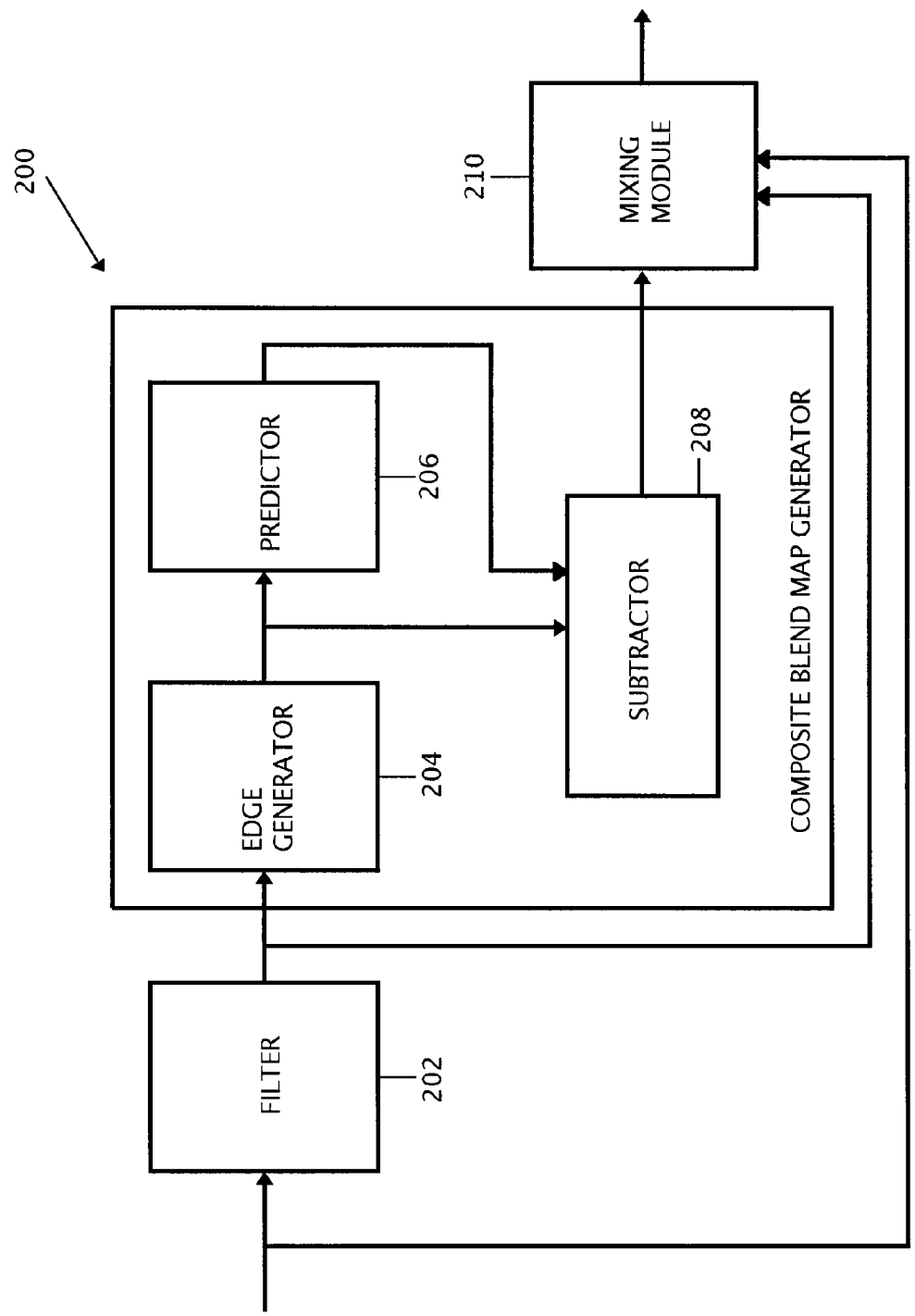
FIG. 2 depicts an alternate example of a system for optimizing a digital signal.

FIG. 2 depicts a system 200 for optimizing a digital signal. In the example of FIG. 2, the system 200 includes a filter 202, an edge detector 204, a predictor 206, a subtractor 208, and a mixing module 210. The filter 202 is coupled to the edge detector 204 and the mixing module 210. The edge detector 204 is coupled to the predictor 206 and the subtractor 208.

The predictor 206 is also coupled to the subtractor 208. The subtractor 208 is coupled to the mixing module 210.

In operation, the filter 202 receives a digital signal. The digital signal is filtered by the filter 202 and provided to the edge detector 204 and the mixing module 210. The edge detector 204 detects the edges of the objects in the filtered digital signal and provides the edge detected signal to the predictor 206 and the subtractor 208.

In certain embodiments, the predictor 206 generates a proximity map in order to determine the regions with unwanted signals within the digital signal. In certain embodiments, the predictor 206 includes a 17×17 block which is passed over each location corresponding to a pixel location of the edge detected signal. In one embodiment, the 17×17 block can be capable of detecting the value of the first derivatives in the edge detected signal. Following this example, the 17×17 block can select the largest edge detection value within the pixel location covered by the 17×17 block and assign the value to the location corresponding to the center. The result of the example is a proximity map of regions with unwanted signals.

As can be seen from the forgoing example, the regions with unwanted signals are in proximity to the detected edges in the digital signal. In other embodiments, any convenient and/or known technique to detect regions of unwanted signals can be utilized. For example, and not limitation, the proximity map can be generated by selecting all pixels within a predetermined threshold of the edges detected in the signal. In alternate embodiments, other attributes, such as object shape or movement rather than edges, can be utilized to determine unwanted signals.

The subtractor 208 receives the proximity map and the edge detected signal. In operation, the subtractor 208 subtracts the edge detected signal from the proximity map. The result can be a composite blend map. In this example, the composite blend map illustrates the areas in which noise is likely to be found. In other embodiments, the subtractor 208 can be replaced with any convenient and/or know device capable of producing a composite blend map. For example, and not limitation, the subtractor 208 can be replaced with an adder. In such an example, the edge detected signal can be inversed and combined with the proximity map to generate the composite blend map.

The mixing module 210 receives the composite blend map from the subtractor 208 as well as the digital signal and the filtered digital signal. The mixing module 210 mixes the digital signal with the filtered digital signal according to the composite blend map in order to generate an optimized signal. In one embodiment, the mixing module 210 replaces all areas in the digital signal that have been indicated on the composite blend map to contain noise with the filtered digital signal. In other embodiments, the mixing module 210 can generate an optimized signal using any convenient and/or known technique. For example, and not limitation, the mixing module 210 can include an additional input which modifies the extent to which the digital signal and the filtered digital signal are combined to generated the optimized digital signal.

Figure 3:
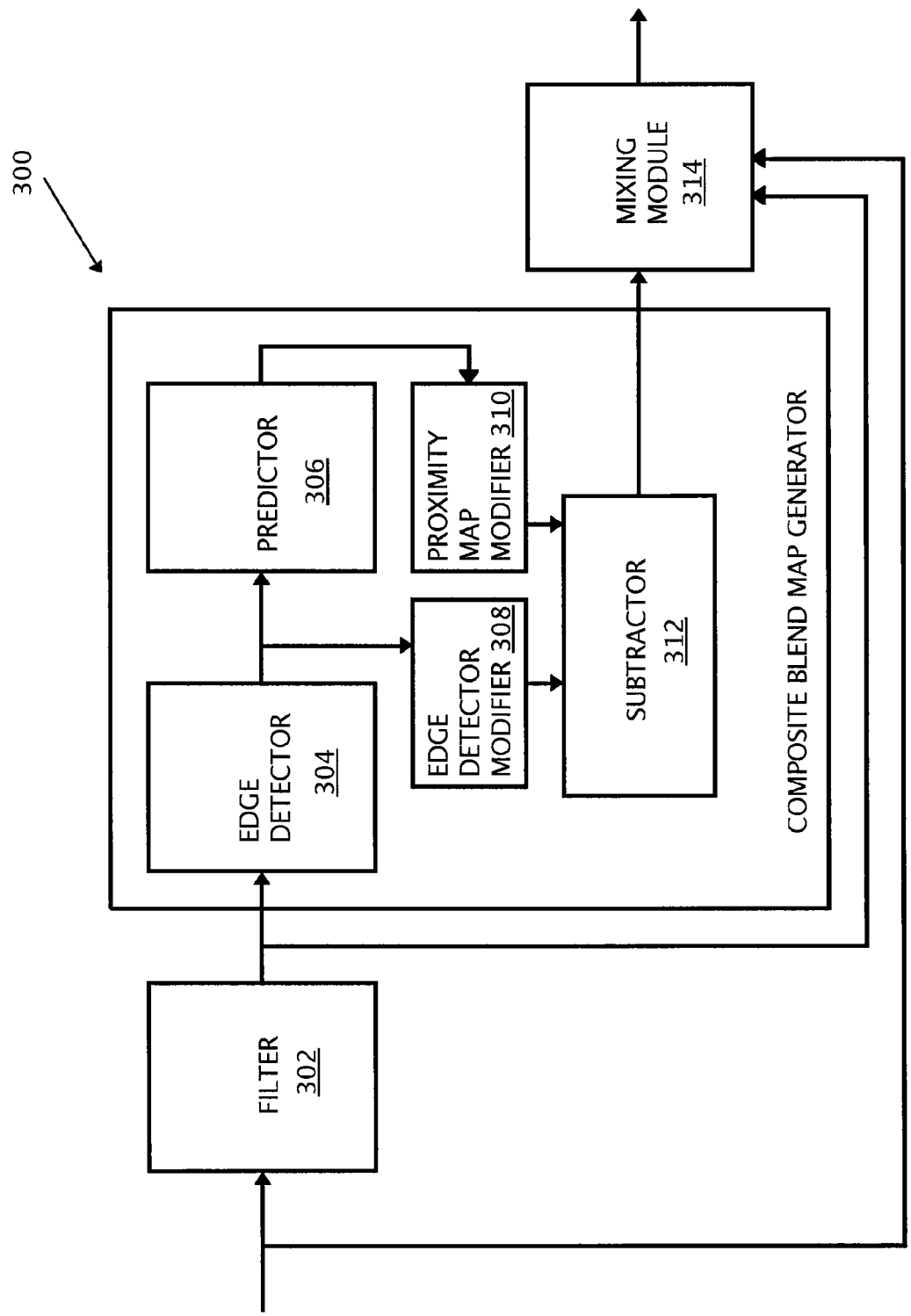
FIG. 3 depicts an alternate example of a system for optimizing a digital signal.

FIG. 3 depicts a system 300 for optimizing a digital signal. In the example of FIG. 3, the system 300 includes a filter 302, an edge detector 304, a predictor 306, an edge detector modifier 308, a proximity map modifier 310, a subtractor 312, and a mixing module 314. The filter 302 is coupled to the edge detector 304 and the mixing module 314. The edge detector 304 is coupled to the predictor 306 and the edge detector modifier 308. The predictor 306 is coupled to the proximity map modifier 310. The edge detector modifier 308 and the proximity map modifier 310 are coupled to the subtractor 312. The subtractor 312 is coupled to the mixing module 314.

In the example of FIG. 3, the edge detector 304 detects the edges in the filtered signal received from the filter 302. The edge detector 304 provides the edge detected signal to the edge detector modifier 308. The edge detector modifier 308 can adjust the edge detected signal according to any convenient and/or known parameters. For example, and not limitation, the edge detector modifier 308 can be adjusted by the user and/or adjusted automatically.

Further, the edge detector modifier 308 can perform any convenient and/or known function. In one embodiment, the edge detection modifier can further enhance the detection of edges in the filtered digital signal. In another embodiment, the edge detection modifier can suppress the detection of edges in the filtered digital signal. In further embodiments, the edge detection modifier can selectively enhance and suppress edges in the filtered signal.

Additionally, in the example of FIG. 3, the predictor 306 generates a proximity map utilizing the edge detected signal provided by the edge detector 304. The predictor 306 provides the proximity map to the proximity map modifier 310. The proximity map modifier 310 can adjust the proximity map according to any convenient and/or known parameters. For example, and not limitation, the proximity map modifier 310 can be adjusted by the user and/or adjusted automatically.

Further, the proximity map modifier 310 can perform any convenient and/or known function. In one embodiment, the proximity map modifier 310 can expand the regions that were detected to have noise. In other embodiments, the proximity map modifier 310 can contract the regions that were detected to have noise. In further embodiments, the proximity map modifier 310 can selectively expand or contract regions that were detected to have noise. Further, in additional embodiments, the filter 302, subtractor 312, and mixing module 314 can each be connected to respective modifier modules in order to further optimize the digital signal.

Figure 4:
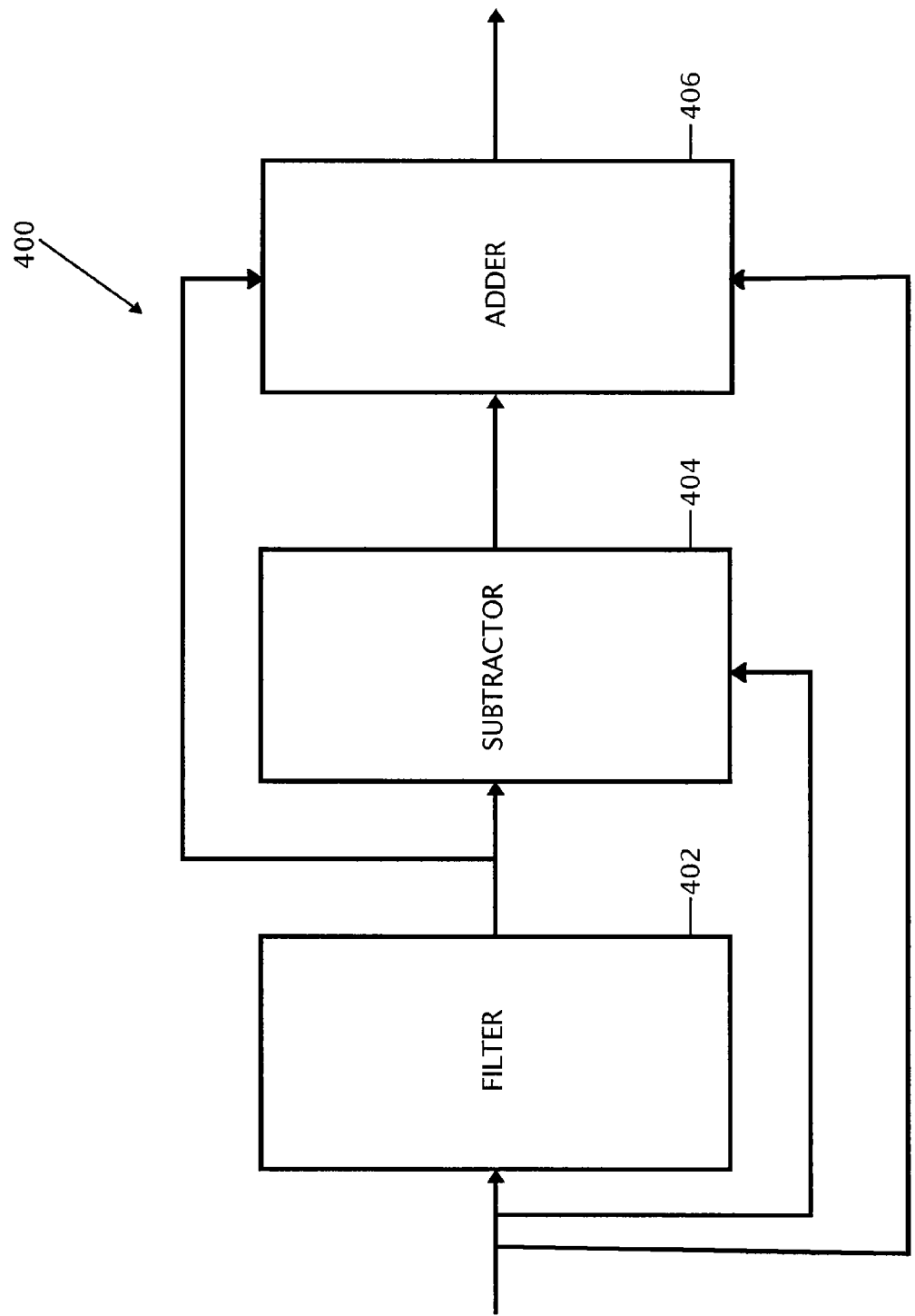
FIG. 4 depicts an example of a system for enhancing a digital signal.

FIG. 4 depicts a system for enhancing a digital signal. In the example of FIG. 4, the system includes a filter 402, a subtractor 404, and an adder 406. The filter 402 is coupled to the subtractor 404. The subtractor 404 is coupled to the adder 406.

In operation, the filter 402 receives a digital signal. The digital signal can be any convenient and/or known digital signal, including but not limited to, a digital video signal. The filter 402 can be any convenient and/or known filter capable of generating a filtered signal. In one embodiment, the filter 402 can be a low-pass filter which blocks the high frequency content of the digital signal.

The subtractor 404 receives the filtered signal from the filter 402, and the digital signal. In operation, the subtractor 404 subtracts the filtered signal from the digital signal in order to generate a modified signal. In certain embodiments, the subtractor can be any known and/or convenient device capable of combining the digital signal and filtered digital signal to produce a desired result. For example, and not limitation, the filtered signal can contain low frequency content of the digital signal. Following the example, the subtractor 404 subtracts the low-frequency content from the digital signal thereby generating the modified signal having high frequency content. In other embodiments, the filter 402 and subtractor 404 can be replaced with a high frequency filter or other suitable convenient and/or known device.

The adder 406 receives the modified signal from the subtractor 404, and the digital signal. In operation, the adder 406 combines the modified signal with the digital signal to generate an optimized signal. In certain embodiments, the adder 406 can be any known and/or convenient device capable of combing the modified signal and the digital signal to produce a desired result. For example, and not limitation, the modified digital signal can contain high frequency content. Following the example, the adder 406 combines the digital signal with the high frequency content thereby generating an optimized signal having the high frequency content enhanced. In other embodiments, the filter 402, the subtractor 404 and the adder 406 can be one device that enhances the high frequency content of the digital signal.

Figure 5:
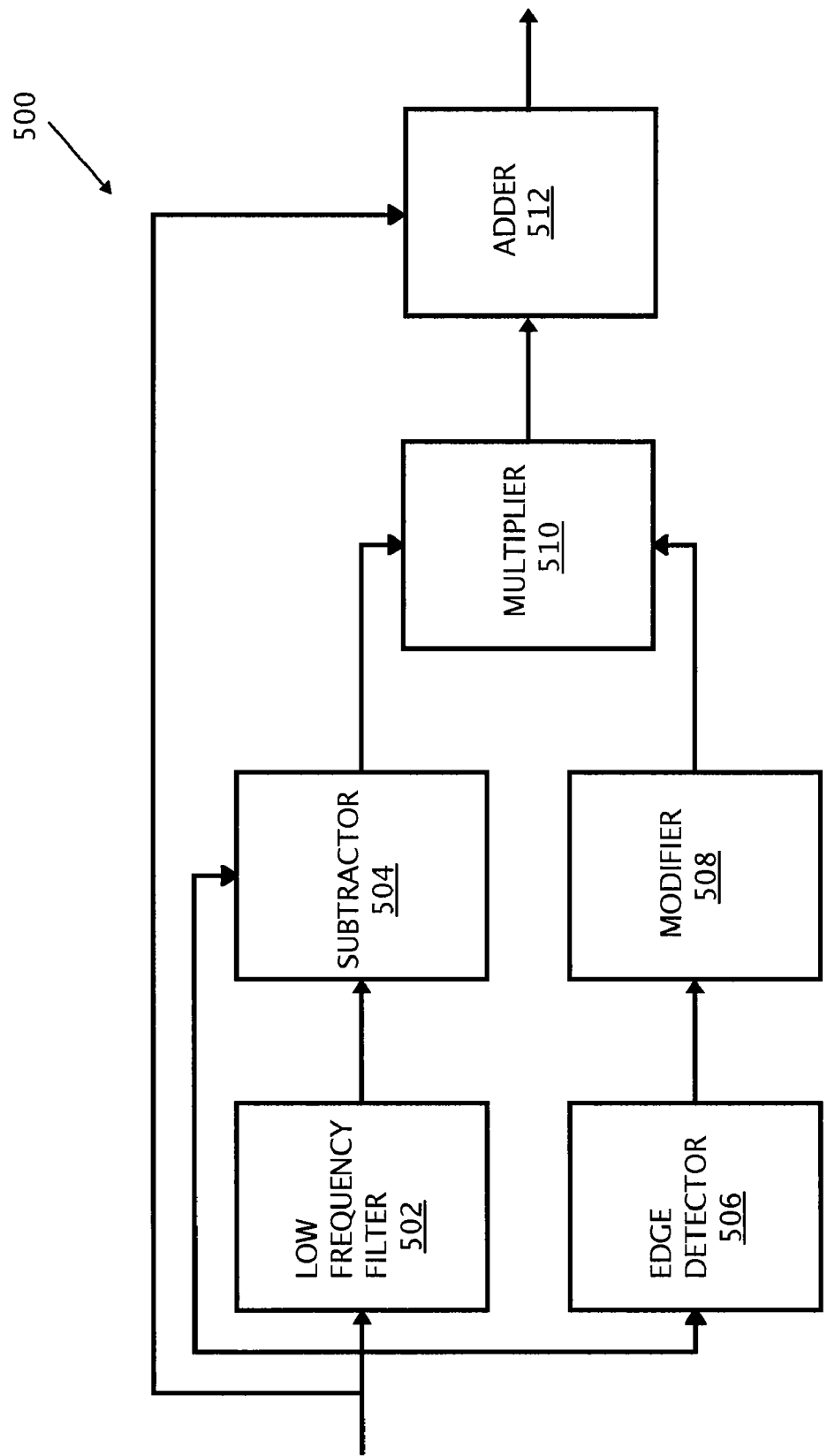
FIG. 5 depicts an alternate example of a system for enhancing a digital signal.

FIG. 5 depicts a system 500 for enhancing a digital signal. In the example of FIG. 5, the system 500 includes a low frequency filter 502, a subtractor 504, an edge detector 506, a modifier 508, a multiplier 510 and an adder 512. The low frequency filter 502 is coupled to the subtractor 504. The edge detector 506 is coupled to the modifier 508. The subtractor 504 and the modifier 508 are coupled to the multiplier 510. The multiplier is coupled to the adder 512.

In operation, the low frequency filter 502 receives a digital signal. The digital signal can be any convenient and/or known format, including for example and not limitation, interlaced, progressive or any broadcast format including, but not limited to NTSC, SECAM or PAL. It should be noted that in certain embodiments analog formats can be digitized and decoded using any convenient and/or known technique in order to generate the desired digital signal. However, in alternate embodiments, an analog signal can be received and a similar operation can be applied in order to generate a desired result. The low frequency filter 502 blocks the high frequency content of the digital signal and provides a signal with low frequency content to the subtractor 504.

The subtractor 504 receives the signal with low frequency content and the digital signal. The subtractor 504 subtracts the signal with low frequency content from the digital signal. The result is a signal with high frequency content. In other embodiments, the low frequency filter 502 and the subtractor 504 can be replaced with a high frequency filter. In further embodiments, any combination of known and/or convenient components can be combined to generate the desired signal. The subtractor 504 provides the resulting signal to the multiplier 510.

The edge detector 506 also receives the digital signal. The edge detector 506 analyzes the digital signal and detects the edges of the objects therein. The edge detector 506 can use any convenient and/or known technique to detect the edges within the digital signal, including for example, calculating a gradient and applying a known and/or convenient operator and/or technique, including but not limited to a Canny edge detector or modification thereof, Sobel technique or modification thereof and/or any other technique involving a high-pass frequency filter, low pass frequency filter, bandpass filter, difference of Gaussians, FIR filter, convolution, first order differential operators and/or second order differential operators. Further, the edge detector 506 can use the technique described in U.S. patent application Ser. No. 11/437,357 to Dale Adams entitled "Edge Detection" filed on May 19, 2006 which is incorporated herein by reference.

The edge detector 506 provides the edge detected signal to the modifier 508. The modifier 508 adjusts the signal in order to obtain a desired result. In some embodiments, the modifier 508 can be preset by a user to perform a default modification to the edge detected signal. In other embodiments, the user can manually adjust the modifier and/or the modifier can be adjusted automatically by the system 500. The modifier 508 provides the modified edge detected signal to the multiplier 510.

In the example of FIG. 5, the multiplier 510 receives the modified edge detected signal from the modifier 508 and the signal with high frequency content from the subtractor 504. The multiplier 510 multiplies the modified edge detected signal and the high frequency content signal to generate a modified high frequency signal. In some embodiments, the characteristics of the multiplier 510 can be adjusted manually and/or automatically in order to obtain a desired result. For example, and not limitation, the multiplier 510 can assign a greater weight to a particular signal to generate a desired result. The multiplier 510 provides the modified high frequency signal to the adder 512.

The adder 512 receives the modified high frequency signal from the multiplier 510 and the digital signal. The adder 512 combines the modified high frequency signal and the digital signal to generate an edge enhanced signal. The adder 512 can be any convenient and/or known device capable of combining the modified high frequency signal and the digital signal to generate an edge enhanced signal. For example, and not limitation, the adder 512 can include combinational logic to produce the desired signal, including but not limited to, an AND gate.

Figure 6:
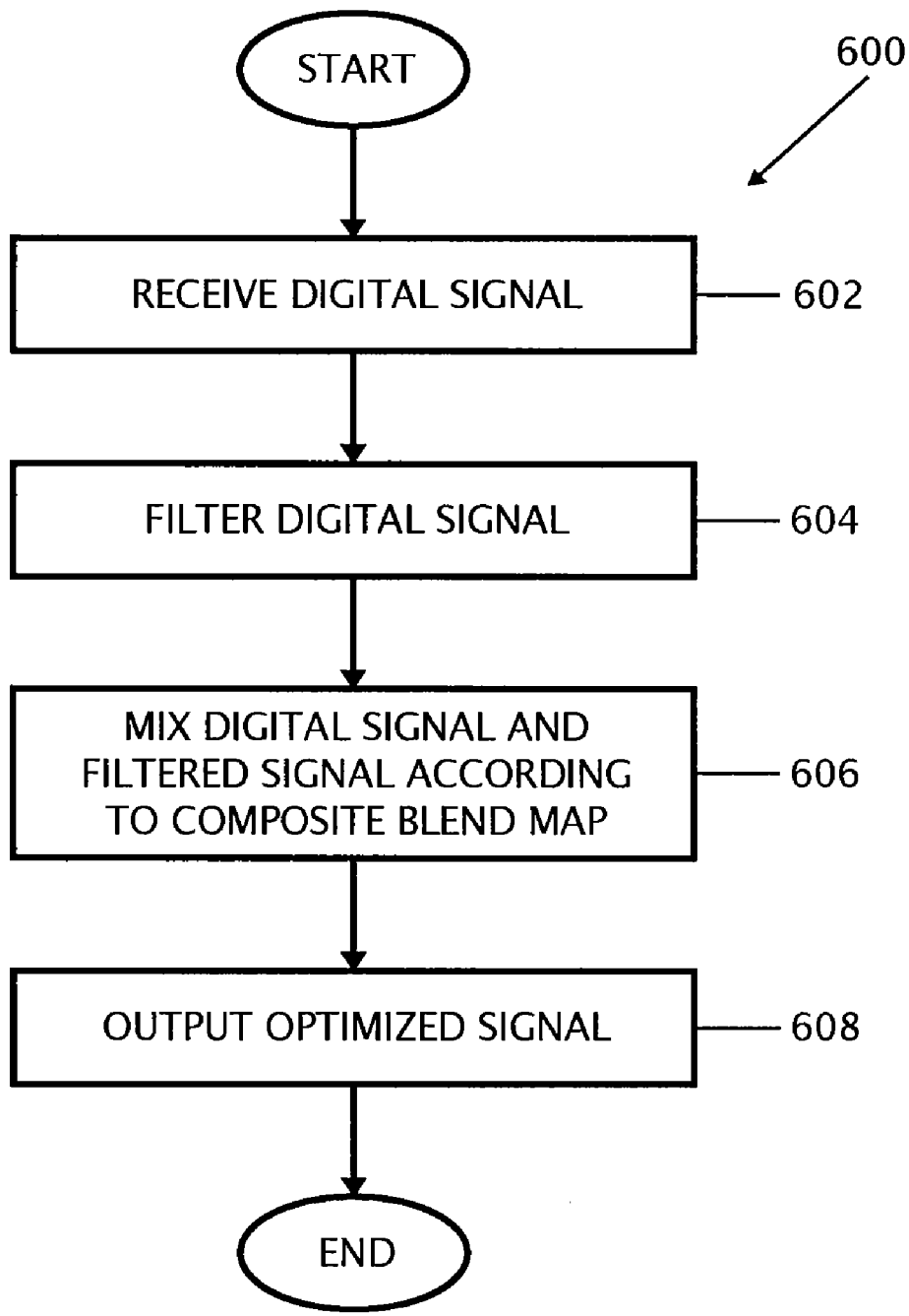
FIG. 6 depicts a flowchart of an example of a method for optimizing a digital signal.

FIG. 6 depicts a flowchart 600 of an example of a method for optimizing a digital signal. FIG. 6 is intended to illustrate the removal of noise from a digital signal. In certain embodiments, noise can include any unwanted electrical signal that is found in the video signal, including but not limited to, general noise, compression artifacts, mosquito noise, and/or block noise which can be correlated to the image or uncorrelated to the image. In the example of FIG. 6, the flowchart 600 begins at module 602 where a digital signal is received. The digital signal can be received using any convenient and/or known interface, including but not limited to, component, composite, DVI, HDMI and/or SDI.

In the example of FIG. 6, the flowchart 600 continues at module 604 where the digital signal is filtered. The digital signal can be filtered using any known and/or convenient device capable of producing a desired signal. In one embodiment, the digital signal is filtered with a low-pass filter in order to produce a signal with low frequency content.

In the example of FIG. 6, the flowchart 600 continues at module 606 where the digital signal and the filtered signal are mixed according to a composite blend map. The digital signal and the filtered signal can be mixed using any known and/or convenient device capable of producing a desired signal. For example, and not limitation, the digital signal and filtered signal can be mixed according to the composite blend map using combination logic. In one embodiment, the regions surrounding the edges in the digital signal can be replaced with the filtered signal in order to reduce noise, such as for example, mosquito noise that results from compression artifacts. At module 608, the optimized digital signal is provided as an output.

Figure 7:
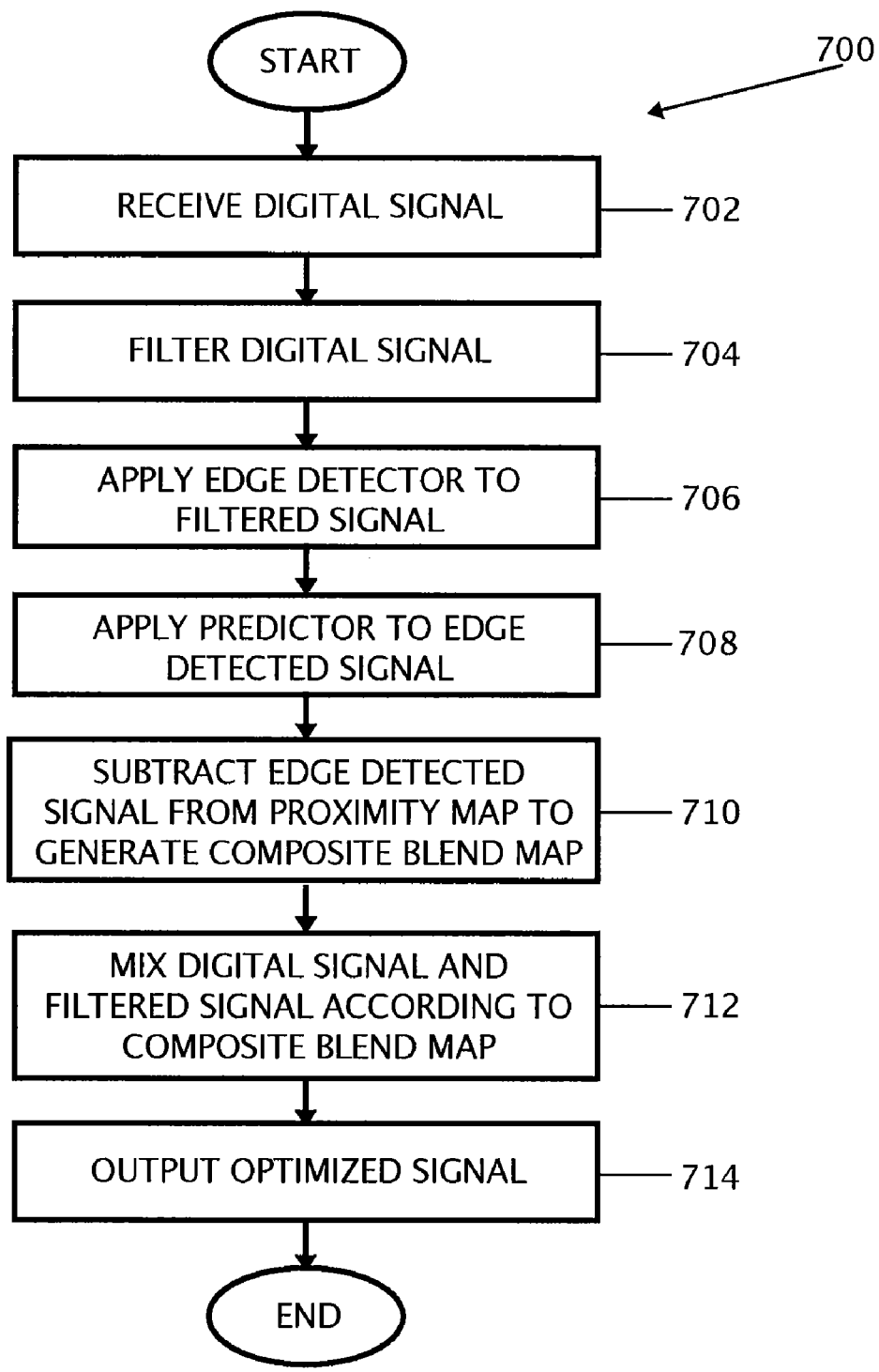
FIG. 7 depicts a flowchart of an alternate example of a method for optimizing a digital signal.

FIG. 7 depicts a flowchart 700 of an example of a method for optimizing a digital signal. FIG. 7 is intended to illustrate the removal of noise from a digital signal. In the example of FIG. 7, the flowchart 700 begins at module 702 where a digital signal is received. The digital signal can be received from any convenient and/or known source. For example, and not limitation, the digital signal can be received using an antenna, set-top box, receiver, DVD player or any other type of device capable of producing a digital signal.

In the example of FIG. 7, the flowchart 700 continues at module 704 where the digital signal is filtered. Once filtered, edges are detected in the filtered digital signal at module 706. At module 708, a predictor is applied to the edge detected signal to generate a proximity map. In one embodiment, the predictor can include a 17×17 block which is passed over each pixel location in the digital signal. In other embodiments, the predictor can include a block of any convenient and/or known size capable of predicting the location of noise.

In the example of FIG. 7, the flowchart 700 continues at module 710 where the edge detected signal is subtracted from the proximity map to generate a composite blend map. At module 712, the digital signal and the filtered signal are combined according to the composite blend map. The result is a digital signal with reduced noise. In one embodiment, the digital signal has reduced mosquito noise around the edges of the objects in the digital signal.

Figure 8:
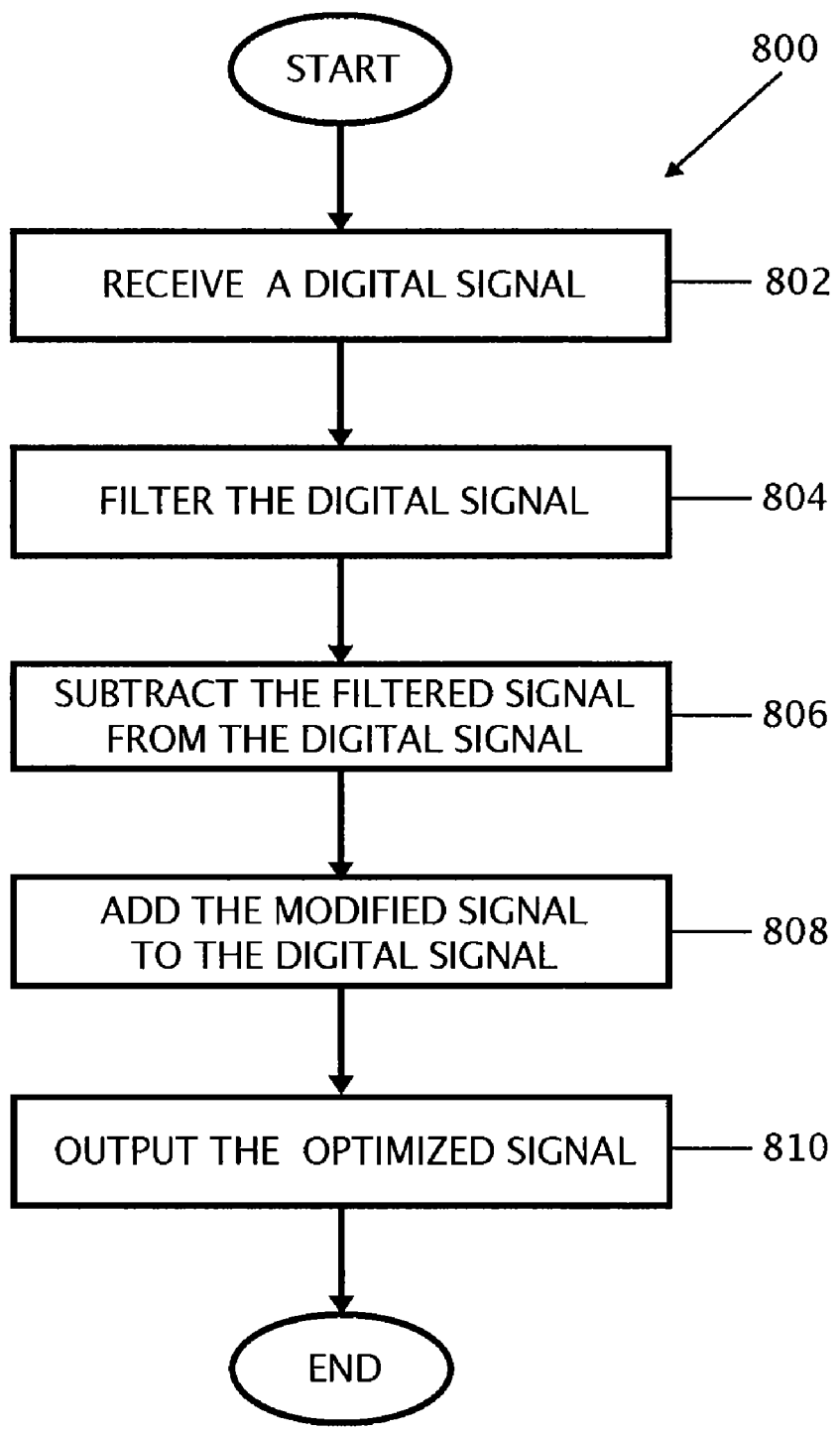
FIG. 8 depicts a flowchart of an alternate example of a method for optimizing a digital signal.

FIG. 8 depicts a flowchart 800 of an example of a method for optimizing a digital signal. FIG. 8 is intended to illustrate the enhancement of a digital signal. In the example of FIG. 8, the flowchart 800 begins at module 802 where a digital signal is received. The flowchart 800 continues at module 804 where the digital signal is filtered.

In the example of FIG. 8, the flowchart 800 continues at module 806 were the filtered signal is subtracted from the digital signal. In certain embodiments, the subtraction step is not necessary if the filter produces a desired signal. For example, and not limitation, if high frequency content is desired, the filter can be a low pass filter and the subtraction step would be necessary. However, for example and not limitation, if high frequency content is desired, the filter can be a high pass filter and the subtraction step would not be necessary. In additional embodiments, any number of convenient and/or known devices and/or steps can be implemented to produce the desired result.

In the example of FIG. 8, the flowchart 800 continues at module 808 where the modified signal is added to the digital signal. In one embodiment, the modified signal contains high frequency content. At module 810, the optimized signal is provided as an output. In one embodiment, the optimized signal can contain enhanced high frequency content.

Figure 9:
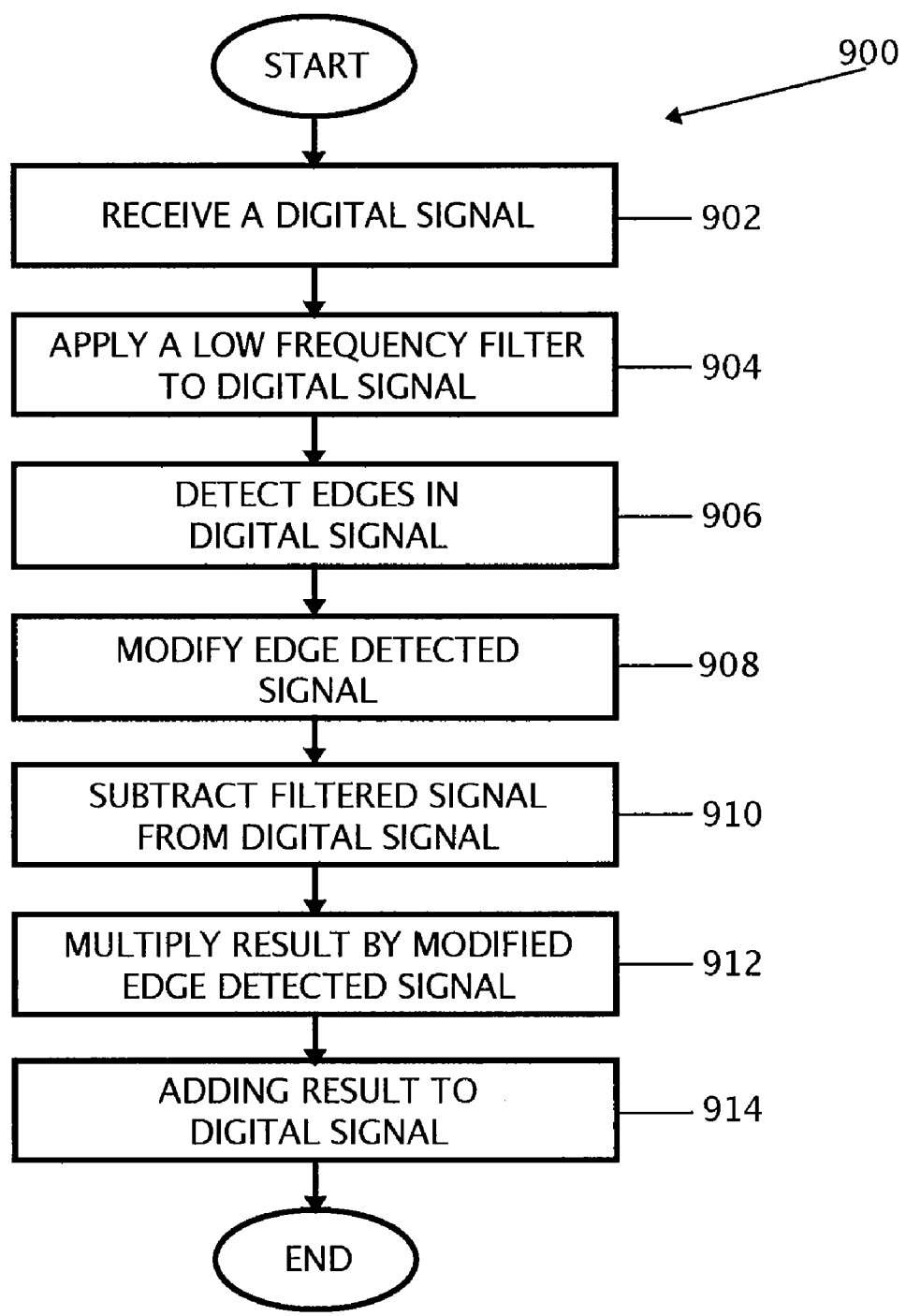
FIG. 9 depicts a flowchart of an alternate example of a method for optimizing a digital signal.

FIG. 9 depicts a flowchart 900 of an example of a method for optimizing a digital signal. FIG. 9 is intended to illustrate enhancing a digital signal. In the example of FIG. 9, the flowchart begins at module 902 where a digital signal is received. At module 904, a low frequency filter is applied to the digital signal. Edges are detected in the filtered signal at module 906. At module 908, the edge detected signal is modified. The modification can be automatic and/or manual according to the desired result of the signal.

In the example of FIG. 9, the flowchart 900 continues at module 910 where the filtered signal is subtracted from the digital signal. At module 912, the result of module 910 is multiplied by the modified edge detected signal from module 908. The result of module 912 is added to the digital signal at module 914 thereby generating the enhanced signal. In other embodiments, steps may be added, modified or removed according to desired functionality of the system and/or output of the signal.

Figure 10:
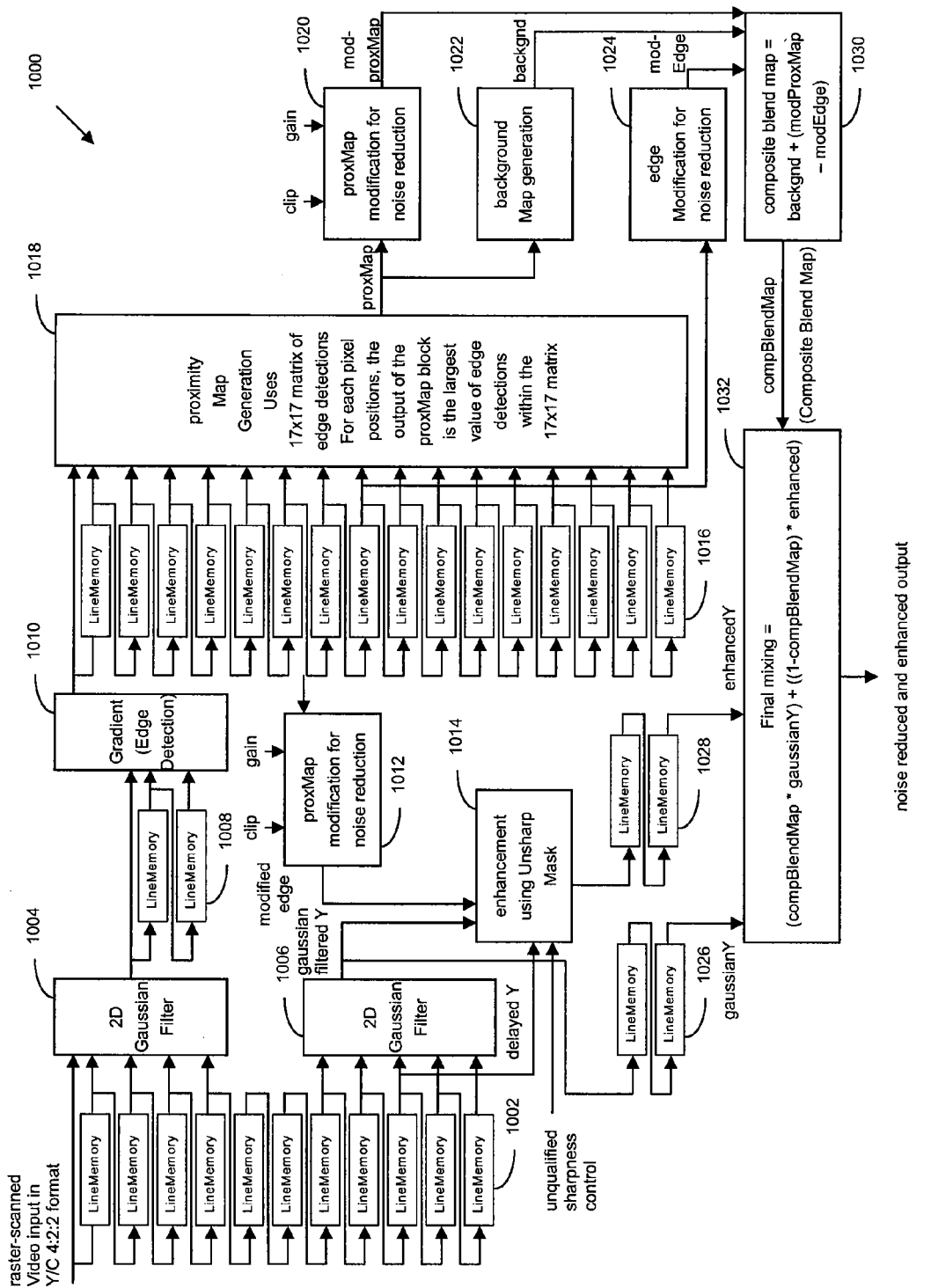
FIG. 10 depicts an alternate embodiment of the present invention.

FIG. 10 depicts and example of a system 1000 for enhancing and optimizing a digital signal. In this example, as well as previous examples, the systems and/or methods can be implemented in software, hardware and/or firmware. Further, the systems and/or methods can be built into a set top box or a television.

In the example of FIG. 10, the system 1000 includes line memory modules 1002 1008 1016 1026 1028, 2D Gaussian filters 1004 and 1006, a gradient module (edge detection) 1010, a proximate map modification module 1012, a proximity map generation module 1018, a proximate map modification module 1020, a background map generation module 1022, an edge modification module 1024, a composite blend map module 1030, an enhancement module 1014, and a final mixing module 1032.

The 2D Gaussian filter 1004 is coupled to the gradient module (edge detection) 1010 as well as line memory 1008. The 2D Gaussian filter 1006 is coupled to the enhancement module 1014 and line memory 1026. The line memories 1002 are connected to the 2D Gaussian filter 1004 and 1006 as well as the enhancement module 1014. The gradient module 1010 is coupled to the proximity map generation module 1018 as well as line memory 1016. The line memories 1016 are coupled to the proximity map generation module 1018, the edge modification module 1024, and the proximate map modification module 1012. The proximity map generation unit 1018 is coupled to the proximate map modification module 1020 and the background map generation module 1022. The proximate map modification module 1020 and the background map generation module 1022, and the edge modification module 1024 are coupled to the composite blend map module 1030. The composite blend map module 1030 is coupled to the final mixing module 1032. The proximate map modification module 1012 is coupled to the enhancement module 1014. The enhancement module 1014 is coupled to line memory 1028. The line memories 1026 and 1028 are coupled to the final mixing module 1032.

In the example of FIG. 10, the Gaussian filter 1004 receives a video input signal as well as inputs from line memories 1002. The Gaussian filter 1006 receives inputs from line memories 1002. The filtered signal from the 2D Gaussian filter 1004 is provided to the gradient module 1010 and the filtered signal from the 2D Gaussian filter 1006 as well as delayed Y signal are provided to the enhancement module 1014. The enhancement module 1014 uses an unsharp mask and the output signal is provided to the line memories 1028. The signal from the gradient module (edge detection) is sent to line memories 1016 and also used to generate a proximity map in module 1018, which is provided to module 1020 for proximate map modification and module 1022 for background map generation. The signal from a line memory 1016 is provided to the edge modification module 1024. The signals from modules 1020, 1022, and 1024 are provided to generate a composite blend map in module 1030 by combining the background signal with the result of subtraction of the edge modification signal from the modified proximate map signal. The 2D Gaussian filter 1006 signal goes through line memories 1026, which is provided to the final mixing module 1032 together with the enhancement module 1014 signal through line memories 1028 and the composite blend map signal from module 1030 to generate an enhanced signal with reduced noise.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method for reducing noise in a digital video signal comprising:
receiving a digital signal, filtering the digital signal thereby generating a filtered signal, mixing the digital signal and the filtered signal according to a composite blend map thereby generating an optimized signal, outputting the optimized signal, wherein a mixing includes retaining one or more non-noisy regions of the digital signal that do not contain noise, and replacing one or more noisy regions that contain noise with the filtered signal, wherein mixing is performed based a composite blend map, wherein the composite blend map is generated by subtracting an edge detected signal from a proximity map, and wherein the composite blend map illustrates the one or more noisy regions that contain noise, wherein the one or more noisy regions are replaced with the filtered signal to generated an optimized signal.

2. A method as recited in claim 1, further comprising:
applying an edge detector to the filtered signal thereby generating the edge detected signal, applying a predictor to the edge detected signal thereby generating the proximity map.

3. A method as recited in claim 2, wherein the edge detector generates the edge detected signal by calculating a gradient of the filtered signal by taking a first derivative of change in luminance in the filtered signal.

4. A method as recited in claim 2, wherein the predictor includes a 17.times.17 block and applying the predictor involves passing the 17.times.17 block over each location corresponding to a pixel location of the edge detected signal.

5. A method as recited in claim 4, wherein the 17.times.17 block has a center capable of detecting the value of first derivatives in the edge detected signal, the 17.times.17 block being further capable of selecting the largest edge detection value within the pixel locations covered by the 17.times.17 block and assigning that value to the location corresponding to the center of the 17.times.17 block in the proximity map.

6. A method as recited in claim 2, further comprising:
modifying the composite proximity map in order to further reduce noise thereby generating a modified composite proximity map.

7. A method as recited in claim 2, further comprising:
modifying the edge detected signal in order to improve selectivity of filtered areas and disqualify areas where filtering is inappropriate.

8. A method as recited in claim 1, wherein the digital signal includes compression artifacts and the optimized signal has a reduced amount of compression artifacts.

9. A method as recited in claim 1, wherein the filtering step involves applying a low pass filter to the digital video signal.

10. A method as recited in claim 1, wherein the filtering step involves applying a Gaussian blur to the digital video signal.

11. A system for removing noise from a digital signal, the system comprising:
a filter capable of receiving and filtering a digital signal, a composite blend map generator capable of receiving the digital signal and generating a composite blend map based on the digital signal, a mixing module capable of mixing the digital signal and the filtered signal according to the composite blend map, wherein mixing includes retaining one or more non-noisy regions of the digital signal that do not contain noise, and replacing one or more noisy regions that contain noise with the filtered signal, wherein mixing is performed based a composite blend map, wherein the composite blend map is generated by subtracting an edge detected signal from a proximity map, and wherein the composite blend map illustrates the one or more noisy regions that contain noise, wherein the one or more noisy regions are replaced with the filtered signal to generated an optimized signal.

12. A system as recited in claim 11, further comprising:
an edge detector capable of receiving the filtered signal and detecting edges within the filtered signal, a proximity map generator capable of receiving the edge detected signal and generating the proximity map based on the edge detected signal.

13. A system as recited in claim 12, further comprising:
a proximity map modifier capable of modifying the proximity map before subtracting the edge detected signal.

14. A system as recited in claim 13, further comprising:
a edge detection modifier capable of modifying the edge detected signal before subtracting from the modified proximity map.

15. A system as recited in claim 13, further comprising:
a proximity map modifier capable of modifying the proximity map signal before subtracting the edge detection signal.

* * * * *